United States Patent [19]

Okami

[11] 4,059,473
[45] Nov. 22, 1977

[54] PRIMER COMPOSITIONS

[75] Inventor: Takehide Okami, Annaka, Japan

[73] Assignee: Shin-Etsu Chemical Company Limited, Tokyo, Japan

[21] Appl. No.: 689,913

[22] Filed: May 25, 1976

[30] Foreign Application Priority Data

May 29, 1975 Japan .................................. 50-64762

[51] Int. Cl.$^2$ .............................................. C09J 5/02
[52] U.S. Cl. ............................ 156/308; 106/287 SB; 156/314; 156/329; 156/326; 260/429.5; 260/448.2 B; 427/302; 427/407 R; 427/387; 428/429; 428/447
[58] Field of Search ............... 156/307, 315, 308, 326, 156/314, 329; 427/407 R, 302, 400, 387; 428/429, 447, 420; 106/287 SB; 260/429.5, 448.2 B, 46.5 E

[56] References Cited

U.S. PATENT DOCUMENTS

| | | | |
|---|---|---|---|
| 2,736,721 | 2/1956 | Dexter | 156/329 |
| 2,774,690 | 12/1956 | Cockett et al. | 260/46.5 E |
| 3,306,918 | 2/1967 | Schenck et al. | 260/429.5 |
| 3,312,669 | 4/1967 | Giordano | 260/46.5 E |
| 3,321,350 | 5/1967 | Fekete | 156/329 |
| 3,364,059 | 1/1968 | Marzocchi | 260/448.2 B |
| 3,398,045 | 8/1968 | Clayton et al. | 156/307 |
| 3,619,255 | 11/1971 | Lengnick | 428/429 |
| 3,772,122 | 11/1973 | Young | 156/315 |

*Primary Examiner*—Charles E. Van Horn
*Assistant Examiner*—J. J. Gallagher
*Attorney, Agent, or Firm*—Toren, McGeady and Stanger

[57] ABSTRACT

The primer compositions consist essentially of a mercapto-containing organosilane or organopolysiloxane as one component and a titanic acid ester as the other. They are suitable for adhesively bonding a room-temperature-curing silicone rubber elastomer irrespective of its crosslinking mechanism to various substrates. The bond obtained by use of the primer composition is very strong and highly resistant to water or sea water even on prolonged immersion at high temperatures.

10 Claims, No Drawings

PRIMER COMPOSITIONS

BACKGROUND OF THE INVENTION

This invention relates to novel primer compositions. More particularly, the invention relates to novel primer compositions useful for forming a strong adhesive bond between the substrate and an overlaying room-temperature-curing silicone rubber composition.

In the application and cure of room-temperature-curing silicone rubber compositions to and on substrate, a variety of primers have been used to produce a strong adhesive bond between the cured silicone elastomers and the substrates. The known primers comprise, for example, alkoxy silanes, such as, vinyl trimethoxysilane, 3-glycidoxypropyl trimethoxysilane, 3-methacryloxypropyl trimethoxysilane, and N(2-aminoethoxy)-3-aminopropyl trimethoxysilane, condensates of partial hydrolyzates or cohydrolyzates of these silanes, titanic acid esters, metal salts of fatty acids, or peroxysilanes. Those primers can, advantageously, serve to make room-temperature-curing silicone rubber adhere to an iron or aluminum surface but disadvantageously, they do not so work when the silicone rubber is cured by the crosslinking mechanism of dehydroxylamination reaction. Further the known primers are disadvantaged by the facts that they show little effectiveness to glass, mortar and asbestos surfaces and that the cured silicone rubber adhesively bonded to the substrate of iron or aluminum with these primers tends to readily peel off when affected by water.

SUMMARY OF THE INVENTION

It is therefore an object of the present invention to provide new primer compositions free of the above-mentioned disadvantages existent in the conventional primers.

It is another object of the present invention to provide a method for adhesively bonding a room-temperature-curing silicone rubber elastomer to a substrate by applying the prime compositions to the surface of the substrate.

The primer compositions of the invention consist essentially of 2 to 98 parts by weight of a mercapto-containing organosilane or organopolysiloxane represented by the average unit formula

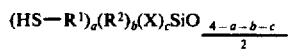

where $R^1$ is an alkylene group having 1 to 4 carbon atoms, $R^2$ is a substituted or unsubstituted monovalent hydrocarbon group, X is a hydroxy or hydrolyzable atom or group and $a$, $b$, and $c$ have values as expressed by $0 < a \leq 1$, $0 \leq b \leq 1$ and $0 < c \leq 3$, respectively, with the proviso that $a + b + c$ has the value as expressed by $0 < (a + b + c) \leq 4$ and 98 to 2 parts by weight of a titanic acid ester.

The primer compositions of the present invention can serve to make a room-temperature-curing silicone rubber elastomer strongly bond to various surfaces contacting it, the surfaces being made of metals including aluminum, copper, stainless steel and brass, plastics, including epoxy resins, vinyl chloride resins and polyester resins, or inorganic substances including glass, mortar and asbestos, and the bonds thus formed being resistant to water and sea water.

DETAILED DESCRIPTION OF THE PREFERRED EMBODIMENTS

To describe the invention in further detail, the organosilanes or organosiloxanes as the first component in the primer composition are expressed by the above-mentioned formula, in which the alkylene groups having 1 to 4 carbon atoms denoted by $R^1$ are exemplified by methylene, ethylene, propylene and butylene groups; the substituted or unsubstituted monovalent hydrocarbon groups denoted by $R^2$ are exemplified by alkyl groups, such as, methyl, ethyl and propyl groups, and cycloalkyl, alkenyl, cycloalkenyl, aryl, halogen-substituted hydrocarbon and cyano-substituted hydrocarbon groups; the hydrolyzable atoms or groups denoted by X besides a hydroxy group are exemplified by alkoxy groups, such as, methoxy and ethoxy groups, acyloxy groups, such as, acetoxy groups, aminoxy and oxime groups.

Illustrative of the mercapto-containing silanes or siloxanes useful in the composition of the invention are the following. They are used either singly or in combination of two or more.

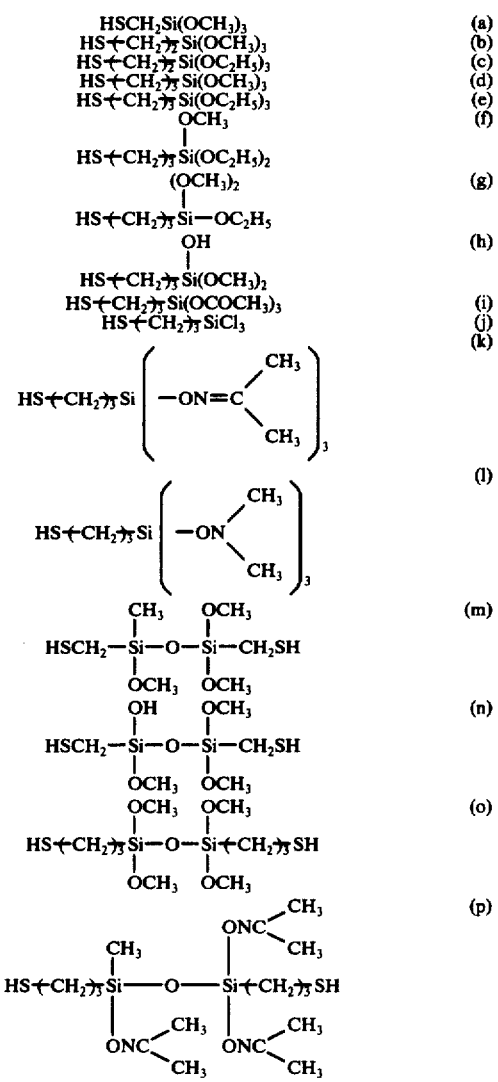

Next, the titanic acid esters as the second component to form the primer compositions of the present invention are exemplified by the following examples. Tetraethyl titanate, tetraisopropyl titanate, tetra(2-ethylhexyl) titanate, tetraphenyl titanate, tetra(2-methoxyethoxy) titanate and diisopropyldiacetoxy titanate and condensates of the partial hydrolyzates or cohydrolyzates of these titanates. They are employed either singly or in combination of two or more.

The above described first and second components of the primer composition in accordance with the present invention are employed in the proportions of from 2 to 98 parts by weight, preferably from 10 to 90 parts by weight of the former to from 98 to 2 parts by weight, preferably from 90 to 10 parts by weight of the latter.

The primer compositions of the present invention are applied to surfaces preferably in the form of dilutions with one or more solvents selected from the group consisting of alcohols, such as, methyl, ethyl and isopropyl alcohols, aromatic hydrocarbons such as, benzene, toluene and xylene, chlorinated, hydrocarbons, such as, trichloroethylene and perchloroethylene, aliphatic hydrocarbons, such as, hexane, ketones, such as, acetone and methylethyl ketone, and esters, such as, ethylacetate.

The amount of the composition of the present invention to be applied to substrate should be 5 g per m$^2$ of coating or more, preferably, 10 g per m$^2$ of coating or more, as the total of the first and second components.

The compositions of the present invention are useful as an effective primer when a room-temperature-curing silicone elastomer is to be bonded to and cured on surfaces of metals, such as, iron, aluminum, copper, zinc, lead, stainless steel and brass, plastics, such as, epoxy resins, vinyl chloride resins and polyester resins, and inorganic materials, such as, glass, mortar and asbestos.

The following examples are given for purposes of illustration to aid in understanding the invention and it is to be understood that the invention is not limited to the specific materials or operating conditions disclosed. Parts in the examples are all parts by weight.

EXAMPLE 1

Primer compositions A, B and C were prepared by mixing 3-mercaptopropyltrimethoxysilane, a titanic acid ester, and dried hexane in the different proportions as indicated in Table I.

Table I

|  | Primer Composition | | |
|---|---|---|---|
|  | A | B | C |
| 3-Mercaptopropyltrimethoxysilane, parts | 6 | 8 | 8 |
| Titanic acid ester: | | | |
| Tetraisopropyl titanate, parts | 4 | 0 | 0 |
| Tetrabutyl titanate, parts | 0 | 2 | 0 |
| Tetra(2-ethylhexyl) titanate, parts | 0 | 0 | 2 |
| Hexane, parts | 90 | 90 | 90 |

Each primer composition was applied on a substrate of mortar formed in accordance with JIS (Japanese Industrial Standard) R 5201 as the base with its surface coated with an epoxy resin (Sanyu Resin L-270, product of Sanyu Resin Co. Ltd., Japan) and cured for 3 days at room temperature in a coating amount of 100 g/m$^2$, followed by air-drying for 30 minutes. Thereupon, a room-temperature-curing silicone elastomer composition of the dehydroxylamination type (KE 70, product of Shin-Etsu Chemical Co. Ltd., Japan) was applied on the thus prepared substrates, which were then allowed to cure at room temperature for 7 days.

An adhesion test was carried out in accordance with JIS A 5755, where the pulling velocity was 100 mm/minute. The results of the test are set out in Table II.

For comparison, a similar testing piece was prepared without the application of any primer, and subjected to the same test. The results are also given in the Table.

Table II

|  | Primer Composition | | | |
|---|---|---|---|---|
|  | A | B | C | None |
| Adhesive strength by pulling, kg/cm$^2$ | 5.3 | 5.4 | 5.2 | 2.1 |
| Elongation at break, % | 783 | 783 | 750 | 180 |
| State of rupture | * | * | * | ** |

*Rupture occurring in the silicone rubber.
**Rupture occurring at the interface.

EXAMPLE 2

A primer composition D was prepared by mixing 7 parts of 3-mercaptopropyltrimethoxysilane, 3 parts of tetraisopropyltitanate, and 90 parts of dried hexane.

With this primer composition, a test piece was prepared and tested in the same manner as in Example 1 and also after having the test pieces elongated by 50% and immersed in sea water kept at 70° C for 4 days. The test results are shown in Table III.

For comparison, similar test pieces were prepared without the application of any primer or with the application of the under-mentioned primer compositions I, II and III. The test results are also given in the Table.

| Primer Composition I | |
|---|---|
| 3-Aminopropyltriethoxysilane | 7 parts |
| Tetraisopropyl titanate | 3 parts |
| Hexane | 90 parts |
| Primer Composition II | |
| N-(2-aminoethyl)-3-aminopropylmethyldimethoxysilane | 7 parts |
| Tetrabuthyl titanate | 3 parts |
| Hexane | 90 parts |
| Primer Composition III | |
| N-(2-aminoethyl)-3-aminopropylmethyldimethoxysilane | 7 parts |
| Tetra(2-ethylhexyl) titanate | 3 parts |
| Hexane | 90 parts |

Table III

|  | Primer Composition | | | | |
|---|---|---|---|---|---|
|  | D | I | II | III | NOne |
| In "as is" state: | | | | | |
| Adhesive strength by pulling, kg/cm$^2$ | 5.7 | 4.6 | 3.6 | 4.5 | 2.2 |
| Elongation at break,% | 1110 | 1020 | 830 | 1030 | 190 |
| Modulus at 150% elongation, kg/cm$^2$ | 1.9 | 1.9 | 1.9 | 2.0 | 1.9 |
| State of rupture | * | * | * | * | ** |
| Afer immersion in sea water: | | | | | |
| Adhesive strength by pulling, kg/cm$^2$ | 4.8 | 2.4 | — | — | — |
| Elongation at break,% | 1210 | 670 | — | — | — |
| Modulus at 150% elongation, kg/cm$^2$ | 1.3 | 1.4 | — | — | — |
| State of rupture | * | ** | ** | ** | ** |

*Rupture occurring in the silicone rubber
**Rupture occurring at the interface

EXAMPLE 3

A test piece was prepared in the same manner as in Example 1 by using a glass plate as the substrate and the primer composition D of Example 2, and tested for the various properties, with the results as set out in Table IV.

For comparison, a similar test piece was prepared without the use of any primer composition and tested similarly with the results as given in the same Table.

Table IV

|  | Primer Composition | |
|---|---|---|
|  | D | None |
| In "as is" state: |  |  |
| Adhesive strength by pulling, kg/cm$^2$ | 4.6 | 4.4 |
| Elongation at break,% | 1300 | 1210 |
| Modulus at 150% elongation, kg/cm$^2$ | 1.6 | 1.6 |
| State of rupture | * | ** |
| After immersion in sea water: |  |  |
| Adhesive strength by pulling, kg/cm$^2$ | 4.1 | — |
| Elongation at break,% | 1180 | — |
| Modulus at 150% elongation, kg.cm$^2$ | 1.5 | — |
| State of rupture | * | — |
| After immersion in deionized water:*** |  |  |
| Adhesive strength by pulling, kg/cm$^2$ | 4.8 | — |
| Elongation at break,% | 1330 | — |
| Modulus at 150% elongation, kg/cm$^2$ | 1.5 | — |
| State of rupture | * | ** |

*Rupture occurring in the silicone rubber.
**Rupture occurring at the interface.
***After having the test piece immersed in deionized water kept at 95° C for 24 hours.

EXAMPLE 4

The same procedure as in Example 3 was taken except that an aluminum or stainless steel plate was used as the substrate instead of glass plate. The test results are given in Table V.

Table V

|  | Aluminum | Stainless steel |
|---|---|---|
| In "as is" state: |  |  |
| Tensile strength,kg/cm$^2$ | 5.0 | 5.5 |
| State of rupture | * | * |
| After immersion in sea water: |  |  |
| Tensile strength, kg/cm$^2$ | 7.4 | 5.9 |
| State of rupture | * | * |
| After immersion in deionized water: |  |  |
| Tensile strength,kg/cm$^2$ | 7.4 | 5.8 |
| State of rupture | * | * |

*Rupture occurring in the silicone rubber.

EXAMPLE 5

Test pieces were prepared in the same procedure as in Example 3 except only that the substrates as indicated in Table VI were used instead of glass plate. These test pieces in an "as is" state were tested for adhesion, with the results shown in the Table.

For comparison, similar test pieces were prepared without the use of any primer, and subjected to tests with the results shown in the same Table.

Table VI

|  | Primer Composition | |
|---|---|---|
|  | D | None |
| Copper | o | x |
| Brass | o | x |
| Galvanized iron | o | x |
| Steel | o | x |
| Enamel | o | x |
| Polyester resin | o | x |
| Marble | o | x |
| Asbestos | o | x |

Note: Mark "o" indicates a good adhesion while mark "x" indicates the occurrence of peeling.

Apart from the above tests, the similar test pieces with the primer composition D and the varied substrates were dipped in deionized water at room temperature for 4 days and then at 90° C for 24 hours, and thereafter subjected to a similar test, to find that all the test pieces exhibited good adhesion.

EXAMPLE 6

Test pieces were prepared in the same procedure as in Example 1 except that the substrates were varied as indicated in Table VII and that a room-temperature-curing silicone rubber elastomer of the deacetoxylation type (KE 42, product of Shin-Etsu Chemical Co., Ltd., Japan) or that of the deoximation type (KE 45, product of the same company) was used instead of the room-temperature-curing silicone rubber elastomer of the dehydroxylamination type. These test pieces in an "as is" state or after immersion in deionized water at room temperature for 4 days were tested for adhesion and the results are set out in Table VII.

For comparison, similar test pieces were prepared without the use of any primer compositions and tested with the results as given in the same Table.

Table VII

| Substrate Primer | | Glass | | Alminum | | Copper | | Brass | | Stainless steel | |
|---|---|---|---|---|---|---|---|---|---|---|---|
|  |  | D | Nil | D | Nil | D | Nil | D | Nil | D | Nil |
| KE42 | In "as is" state | o | o |  |  |  |  |  |  | o | x |
|  | After immersion | o | x |  |  |  |  |  |  | o |  |
| KE45 | In "as is" state |  |  | o | x | o | x | o | x | o | x |
|  | After immersion |  |  | o |  | o |  | o |  | o |  |

EXAMPLE 7.

Primer compositions E, F and G were prepared by mixing 3-mercaptopropyltrimethoxysilane, tetraisopropyl titanate and dried hexane in the proportions as indicated in Table VIII.

Table VIII

|  | Primer Composition | | |
|---|---|---|---|
|  | E | F | G |
| 3-Mercaptopropyltrimethoxy-silane, parts | 8 | 5 | 2 |
| Tetraisopropyl titanate, parts | 2 | 5 | 8 |
| Hexane, parts | 90 | 90 | 90 |

Then the above primer compositions were applied on the same substrates as used in Example 1, followed by the same treatment as in Example 1 to form test pieces. The test pieces were subjected to the adhesion test with the results shown in Table IX.

For comparison, similar test pieces were prepared without the use of any primer compositions for purposes of a similar test. The results are also given in the same Table.

Table IX

|  | Primer Composition | | | |
| --- | --- | --- | --- | --- |
|  | E | F | G | None |
| In "as is" state | o | o | o | x |
| After immersion in sea water kept at 70° C for 4 days | o | o | o | x |
| After immersion in deionized water at room temperature for 4 days | o | o | o | x |

Note:
Mark "o" indicates a good adhesion, while mark "x" indicates the occurrence of peeling.

EXAMPLE 8

A mixture of 36.0 g of 3-mercaptopropylmethyldimethoxy silane and 58.8 g of 3-mercaptopropyltrimethoxy silane was dropped into a mixture of 5.0g of water and 100 g of dioxane. After the resulting mixture was stirred at 70° C for 3 hours to cause partial hydrolysis reaction, the solvent was distilled off together with the methyl alcohol formed by the hydrolysis of the silanes, to produce 86.5 g of a siloxane product having mercaptopropyl groups in its molecules as the partial hydrolyzate-condensate. To 6 g of this siloxane product were added 4 g of tetrabutyl titanate and 90 g of dried hexane to prepare a primer composition H.

The same procedures as in Example 1 for the preparation of a test piece and the carrying out of an adhesion test except only that the above-obtained primer composition H was used instead of the primer composition A, B or C. The test results are set out in Table X.

For comparison, a similar test piece was prepared without the use of any primer, and subjected to the adhesion test. The comparative test results are also given in the Table.

Table X

|  | Primer Composition | |
| --- | --- | --- |
|  | H | None |
| In "as is" state: | | |
| Adhesive strength by pulling, kg/cm² | 5.6 | 2.1 |
| Elongation at break, % | 1030 | 190 |
| State of rupture | * | ** |
| After immersion in sea water kept at 70° C for 4 days | | |
| Adhesive strength by pulling, kg/cm² | 4.6 | — |
| Elongation at break,% | 960 | — |
| State of rupture | * | — |

*Rupture occurring in the silicone rubber.
**Rupture occurring at the interface.

What is claimed is:

1. A primer composition consisting essentially of (1) 2 to 98 parts by weight of a mercapto-containing organosilane or organopolysiloxane represented by the average unit formula $$(HS-R^1)_a(R^2)_b(X)_c SiO_{\frac{4-a-b-c}{2}}$$

where $R^1$ is an alkylene group having 1 to 4 carbon atoms, $R^2$ is a substituted or unsubstituted monovalent hydrocarbon group, X is a hydroxy or hydrolyzable atom or group and $a$, $b$, and $c$ have values as expressed by $0<a\leq 1$, $0\leq b\leq 1$ and $0<c\leq 3$, respectively, with the proviso that $a+b+c$ has the value as expressed by $0<(a+b+c)\leq 4$ and (2) 98 to 2 parts by weight of a titanic acid ester.

2. The primer composition as claimed in claim 1 wherein said $R^1$ is a propylene group.

3. The primer composition as claimed in claim 1 wherein said $R^2$ is a methyl group.

4. The primer composition as claimed in claim 1 wherein said hydrolyzable group denoted by X is a methoxy group.

5. The primer composition as claimed in claim 1 wherein said component (1) is 3-mercaptopropyltrimethoxysilane.

6. The primer composition as claimed in claim 1 wherein said organopolysiloxane is a condensate of a partial cohydrolyzate of 3-mercaptopropylmethyldimethoxysilane and 3-mercaptopropyltrimethoxysilane.

7. The primer composition as claimed in claim 1 wherein said titanic acid ester is selected from the group consisting of tetraisopropyl titanate, tetrabutyl titanate and tetra(2-ethylhexyl) titanate.

8. The primer composition as claimed in claim 1 wherein the amount of said components (1) and (2) is in the ratio of from 10:90 to 90:10 by weight.

9. A method for adhesively bonding a room-temperature-curing silicone rubber elastomer to a substrate which comprises applying to the surface of the substrate a primer composition consisting essentially of (1) 2 to 98 parts by weight of a mercapto-containing organosilane or organopolysiloxane represented by the average unit formula $$(HS-R^1)_a(R^2)_b(X)_c SiO_{\frac{4-a-b-c}{2}}$$

where $R^1$ is an alkylene group having 1 to 4 carbon atoms, $R^2$ is a substituted or unsubstituted monovalent hydrocarbon group, X is a hydroxy or hydrolyzable atom or group and $a$, $b$, and $c$ have values as expressed by $0<a\leq 1$, $0\leq b\leq 1$ and $0<c\leq 3$, respectively, with the proviso that $a=b=c$ has the value as expressed by $0<(a+b+c)\leq 4$ and (2) 98 to 2 parts by weight of a titanic acid ester, contacting the uncured elastomer with the thus primed surface, and subjecting the thus contacted elastomer to curing conditions.

10. The method as claimed in claim 9 wherein said primer composition is applied to the surface of the substrate in an amount larger than 5 g per square meter of the surface area.

* * * * *